(12) United States Patent
Schat

(10) Patent No.: US 11,023,623 B2
(45) Date of Patent: Jun. 1, 2021

(54) METHOD FOR TRIGGERING AND DETECTING A MALICIOUS CIRCUIT IN AN INTEGRATED CIRCUIT DEVICE

(71) Applicant: NXP B.V., Eindhoven (NL)

(72) Inventor: Jan-Peter Schat, Hamburg (DE)

(73) Assignee: NXP B.V., Eindhoven (NL)

( * ) Notice: Subject to any disclaimer, the term of this patent is extended or adjusted under 35 U.S.C. 154(b) by 310 days.

(21) Appl. No.: 15/950,207

(22) Filed: Apr. 11, 2018

(65) Prior Publication Data
US 2019/0318135 A1     Oct. 17, 2019

(51) Int. Cl.
*G01R 31/317* (2006.01)
*G01R 31/3177* (2006.01)
*G06F 21/71* (2013.01)
*G06F 21/56* (2013.01)
*G06F 11/263* (2006.01)
(Continued)

(52) U.S. Cl.
CPC .......... *G06F 21/85* (2013.01); *G01R 31/3177* (2013.01); *G01R 31/31703* (2013.01); *G01R 31/31724* (2013.01); *G06F 11/26* (2013.01); *G06F 11/263* (2013.01); *G06F 21/566* (2013.01); *G06F 21/71* (2013.01); *G06F 2221/034* (2013.01)

(58) Field of Classification Search
CPC ................ G06F 21/566; G01R 31/317; G01R 31/31703; G01R 31/31704; G01R 31/31707; G01R 31/31724; G01R 31/77; G01R 31/3181
See application file for complete search history.

(56) References Cited

U.S. PATENT DOCUMENTS 5,485,471 A  *  1/1996  Bershteyn ...... G01R 31/318371
                                                          714/733
7,975,307 B2     7/2011  Tkacik et al.
(Continued)

OTHER PUBLICATIONS

Abramovici, Miron, et al.; "Integrated Circuit Security New Threats and Solutions;" Proceedings of the Fifth Annual Workshop on Cyber Security and Information Intelligence Challenges and Strategies; Oak Ridge, TN, Apr. 13-15, 2009; doi>10.1145/1558607.1558671.
(Continued)

*Primary Examiner* — Daniel B Potratz
*Assistant Examiner* — D'Arcy Winston Straub
(74) *Attorney, Agent, or Firm* — Daniel D. Hill

(57) ABSTRACT

A method for triggering and detecting a malicious circuit on an integrated circuit device is provided. A first run of test patterns is provided to logic circuits on the integrated circuit device. Each test pattern of the first run of test patterns includes a plurality of bits, a first portion of the plurality of bits being bits that do not influence a value of a resulting first test output vector, and a second portion of the plurality of bits being bits that will influence the value of the first test output vector. The value of the first test output vector is compared to first expected values. Bit values of the first portion of the plurality of bits for each test pattern of the first run of test patterns are changed to generate a second run of test patterns. The second run of test patterns is provided to the logic circuits on the integrated circuit device. A value of the second run of test patterns is compared to second expected values.

16 Claims, 3 Drawing Sheets

(51) Int. Cl.
  *G06F 11/26* (2006.01)
  *G06F 21/85* (2013.01)

(56) References Cited

U.S. PATENT DOCUMENTS

| | | | |
|---|---|---|---|
| 8,726,112 B2 | 5/2014 | Rajski et al. | |
| 10,083,303 B2* | 9/2018 | Vedula | G06F 21/56 |
| 2012/0047412 A1* | 2/2012 | Chung | G06F 30/398 |
| | | | 714/731 |

OTHER PUBLICATIONS

Basak, Abhishek, et al; "Security Assurance for System-on-Chip Designs With Untrusted IPs;" IEEE Transactions on Information Forensics and Security; Jan. 25, 2017, vol. 12, Issue: 7; pp. 1515-1528; DOI: 10.1109/TIFS.2017.2658544.

Bernstein, Kerry; "Trusted Integrated Circuits (TRUST);" Defense Advanced Research Projects Agency; Internet: https://www.darpa.mil/program/trusted-integrated-circuits.

Bhunia, Swarup, et al.; "Protection Against Hardware Trojan Attacks: Towards a Comprehensive Solution;" IEEE Design & Test, vol. 30, Issue 3, Jun. 2013; pp. 6-17; DOI: 10.1109/MDT.2012.2196252.

Bhunia, Swarup, et al.; "Hardware Trojan Attacks: Threat Analysis and Countermeasures;" Proceedings of the IEEE, vol. 102, No. 8, Aug. 2014, pp. 1229-1247; DOI: 10.1109/JPROC.2014.2334493.

Chakraborty, Rajat Subhra, et al., "MERO: A Statistical Approach for Hardware Trojan Detection;" CHES '09 Proceedings of the 11th International Workshop on Cryptographic Hardware and Embedded Systems; Lausanne, Switzerland, Sep. 6-9, 2009; pp. 396-410.

Hicks, Matthew, et al.; "Overcoming an Untrusted Computing Base: Detecting and Removing Malicious Hardware Automatically;" 2010 IEEE Symposium on Security and Privacy, p. 159-172.

IEEE 1149.10—2017 IEEE Standard for High-Speed Test Access Port and On-Chip Distribution Architecture; May 18, 2017; pp. 1-96.

Li, He; et al.; "A Survey of Hardware Trojan Detection, Diagnosis and Prevention;" 2015 14th International Conference on Computer-Aided Design and Computer Graphics (CAD/Graphics), pp. 173-180; DOI: 10.1109/CADGRAPHICS.2015.41.

Merritt, Rick; "U.S. Paves Roads to Trusted Fabs;" EETimes; Jul. 11, 2017; Internet: https://www.eetimes.com/document.asp?doc_id=1331990.

Ray, Sandip, et al.; "System-on-Chip Platform Security Assurance: Architecture and Validation;" Proceedings of the IEEE; Jan. 2018, vol. 106, Issue: 1; pp. 21-37; DOI: 10.1109/JPROC.2017.2714641.

Sally Adee; "The Hunt for the Kill Switch;" IEEE Spectrum, vol. 45, No. 5; May 2008, pp. 34-39; DOI: 10.1109/MSPEC.2008.450531.

Xiao, Kan, et al.; "BISA: Built-in Self-authentication for Preventing Hardware Trojan Insertion;" 2013 IEEE International Symposium on Hardware-Oriented Security and Trust (HOST); Jun. 2-3, 2013; pp. 45-50; DOI: 10.1109/HST.2013.6581564.

\* cited by examiner

METHOD FOR TRIGGERING AND DETECTING A MALICIOUS CIRCUIT IN AN INTEGRATED CIRCUIT DEVICE

BACKGROUND

Field

This disclosure relates generally to integrated circuits, and more particularly, to a method for triggering and detecting a malicious circuit in an integrated circuit device.

Related Art

The risk from malicious software is a common problem that requires continuous efforts to resist. However, malicious hardware circuits implemented on an electronic device, such as an integrated circuit (IC), may also be a problem. The malicious circuits may be added to functional logic of an IC design without the semiconductor manufacturer's knowledge. The malicious circuits are commonly referred to as Hardware Trojans. The circuits may be added by, for example, intellectual property (IP) vendors, layout centers, or foundries. They can be used to either disturb functionality, disclose secret keys, or open backdoors for other attacks.

The risk of Hardware Trojans has been growing in recent years due to increasing use of external IP, more outsourcing of fabrication processes, and increasing system complexity. Customers of semiconductor manufacturers have become aware of the risk of Hardware Trojans and have started to require semiconductor manufacturers to take appropriate security measures.

The risk of implementations of Hardware Trojans may be defended against by using only trusted IP providers, trusted layout centers and certified layout and verification tools. As these measures cannot provide complete safety against hardware trojans, it is desirable to be able to detect Hardware Trojans on the IC using dedicated test methods. To prevent detection, the Hardware Trojans may delay activation to escape detection during production testing. Hardware Trojan detection on ICs should thus include detection mechanisms for use in the field. While testing in the field for functional safety is widely used; testing in the field for Hardware Trojans detection is rarely used, and requires a different approach compared to a field test for functional safety.

Therefore, a need exists for a method to trigger and detect the presence of hardware trojans on ICs.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
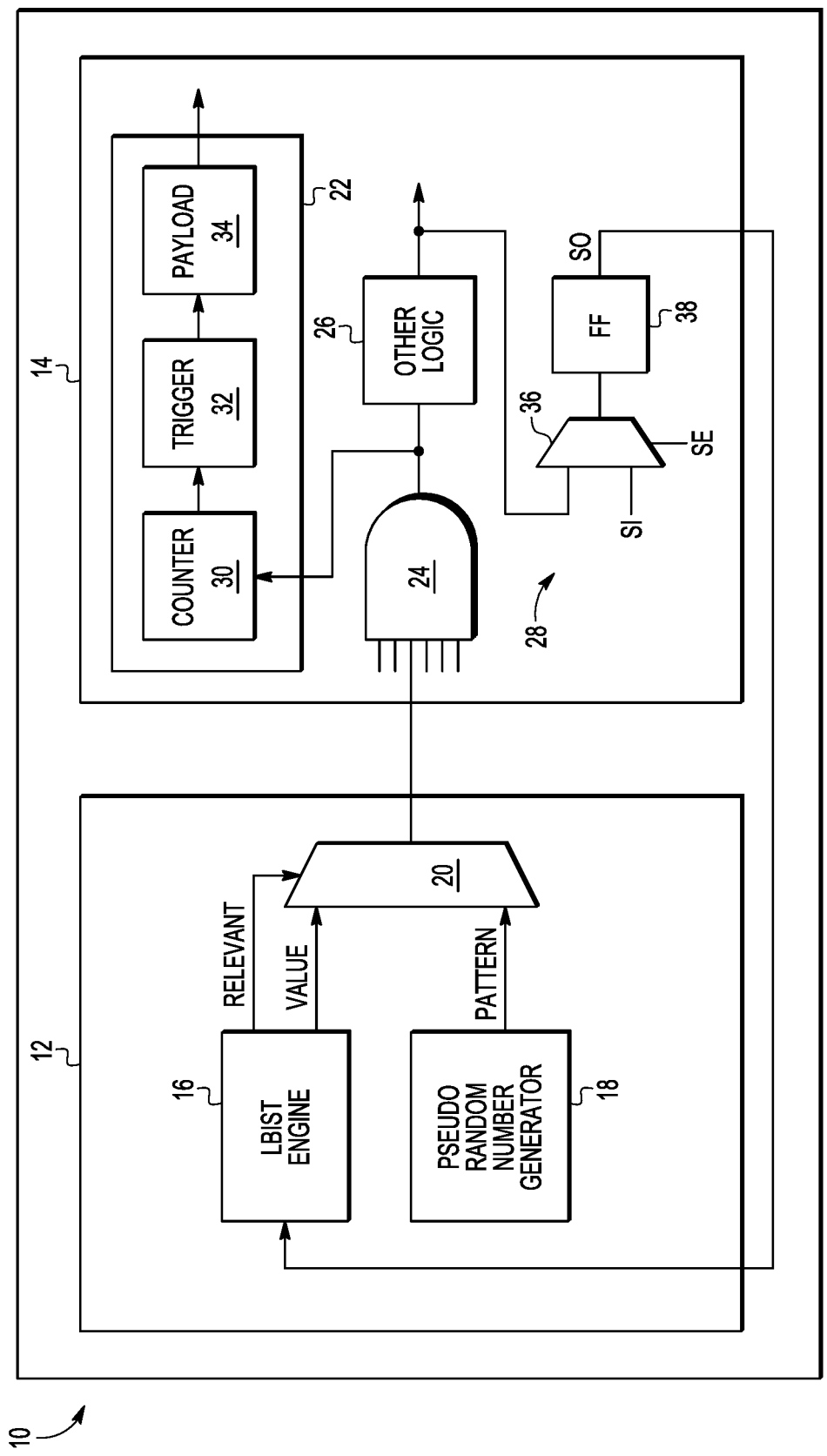
FIG. 1 illustrates an integrated circuit device in accordance with an embodiment.

Generally, there is provided, a method for triggering and detecting malicious circuits (Hardware Trojans) on an IC device. In one embodiment, the method may be performed in the field and after production testing using logic built-in self-test (LBIST) circuitry. In one embodiment, using the LBIST circuitry, multiple runs of test patterns, each run having a plurality of test patterns, are provided to the IC. The plurality of test patterns includes "don't care" bits and "care" bits. The "don't care" bits are bits that do not influence a value of a resulting output vector. Conversely, "care" bits do influence a resulting output vector. Generally in structural testing, the plurality of test patterns are not changed between runs. However, in the described embodiments, to trigger and detect a malicious circuit, the "don't care" bits are changed between runs. In one embodiment, the "don't care" bits are pseudo randomly changed between runs. Changing the "don't care" bits is intended to trigger a malicious circuit that has been designed to delay activation so that the malicious circuit is not detected during production testing and/or lab validation. In another embodiment, the method for malicious circuit triggering and detecting is accomplished using an external tool such as an automatic test pattern generator (ATPG).

In accordance with an embodiment, a method is provided for triggering and detecting a malicious circuit on an integrated circuit device, the method includes: providing a first run of test patterns to logic circuits on the integrated circuit device, the first run of test patterns comprising a plurality of test patterns, each test pattern of the first run of test patterns comprising a plurality of bits, a first portion of the plurality of bits being bits that do not influence a value of a resulting first test output vector, and a second portion of the plurality of bits being bits that will influence the value of the first test output vector; outputting the first test output vector from the first run of test patterns; comparing the value of the first test output vector to first expected values; changing bit values of the first portion of the plurality of bits for each test pattern of the first run of test patterns to generate a second run of test patterns; providing the second run of test patterns to the logic circuits on the integrated circuit device; outputting a second test output vector resulting from the second run of test patterns; and comparing a value of the second run of test patterns to second expected values. The plurality of test patterns may be generated by a self-testing circuit on the integrated circuit device. The self-testing circuit may be characterized as being a logic built-in self-test (LBIST) circuit. The first portion of the plurality of bits may be characterized as being don't care bits, and the second portion of the plurality of bits may be characterized as being care bits. Changing bit values may further include using a pseudo random number generator to change the bit values. The method may be for triggering a malicious hardware circuit undetected by production testing. The first and second runs of test patterns may be generated externally to the integrated circuit device using an automatic test pattern generator (ATPG). The logic circuits being tested may be realized in a register-transfer level (RTL) design and implemented as registers and combinational logic on the integrated circuit device.

In another embodiment, a method is provided for triggering and detecting a malicious circuit on an integrated circuit device, the method includes: scanning in a first run of test patterns to logic circuits on the integrated circuit device using logic built-in self-test (LBIST), the first run of test patterns comprising a plurality of test patterns, each test pattern of the first run of test patterns comprising a plurality of bits, a first portion of the plurality of bits being bits that do not influence a value of a resulting first test output vector, and a second portion of the plurality of bits being bits that will influence the value of the first test output vector; scanning out the first test output vectors from the first run of test patterns; comparing the value of the first test output vectors to first expected values; changing bit values of the first portion of the plurality of bits for each test pattern of the first run of test patterns to generate a second run of test patterns; scanning in the second run of test patterns to the logic circuits on the integrated circuit device; scanning out the second test output vectors resulting from the second run of test patterns; and comparing a value of the second run of test patterns to second expected values. The first portion of the plurality of bits may be characterized as being don't care bits, and the second portion of the plurality of bits may be characterized as being care bits. Changing bit values may further include using a pseudo random number generator to change the bit values. The method may be for triggering a malicious hardware circuit undetected by production testing.

In yet another embodiment, a method is provided for triggering and detecting a malicious circuit on an integrated circuit device, the method includes: scanning in a first run of test patterns to logic circuits on the integrated circuit device using logic built-in self-test (LBIST), the first run of test patterns comprising a plurality of test patterns, each test pattern of the first run of test patterns comprising a plurality of bits, a first portion of the plurality of bits being bits that do not influence a value of a resulting first test output vector, and a second portion of the plurality of bits being bits that will influence the value of the first test output vector; scanning out the first test output vectors from the first run of test patterns; comparing the value of the first test output vectors to first expected values; changing bit values of the first portion of the plurality of bits for each test pattern of the first run of test patterns to generate a second run of test patterns; scanning in the second run of test patterns to the logic circuits on the integrated circuit device; scanning out the second test output vectors resulting from the second run of test patterns; comparing a value of the second run of test patterns to second expected values; and detecting the malicious hardware in response to comparing the values of the first and second test output vectors. The first portion of the plurality of bits may be characterized as being don't care bits, and the second portion of the plurality of bits may be characterized as being care bits. Changing bit values may further include using a pseudo random number generator to change the bit values. The logic circuits being tested may be realized in a register-transfer level (RTL) design and implemented as registers and combinational logic on the integrated circuit device.

FIG. 1 illustrates a simplified diagram of integrated circuit device 10 in accordance with an embodiment. Integrated circuit device 10 is illustrated with circuit blocks useful for describing various functions and aspects of the illustrated embodiment. For example, integrated circuit device 10 includes LBIST block 12 and functional logic 14. LBIST 12 includes LBIST engine 16, pseudo random number generator (PRNG) 18, and multiplexer 20. Functional logic 14 includes a malicious circuit 22, AND logic gate 24, other logic 26, and scan chain portion 28. Malicious circuit 22 is illustrated as being part of functional logic 14 in FIG. 1. However, the manufacturer of the IC device 10 may not consider malicious circuit 22 as part of the IC, but as an intruder, or a circuit that does not belong. An ATPG tool may consider malicious circuit 22 as belonging to function logic 14 because the ATPG tool may not be able to distinguish it from other functional logic. Malicious circuit 22 includes counter 30, trigger circuit 32, and payload 34. Scan chain portion 28 is an output portion of a conventional scan chain for use with LBIST block 12. San chain portion 28 includes multiplexer 36 and scan flop 38. It is understood that an IC will have other functional blocks not illustrated in FIG. 1. Examples of other functional blocks include, but are not limited to, processor(s), memory pages of random access memory (RAM), flash memory, and other types of non-volatile memory (NVM), an arithmetic logic unit (ALU), a debug interface, peripheral units such as a serial peripheral interface (SPI), analog-to-digital converter (ADC), controller area network (CAN), ethernet function block, and a DMA. There may also be system control functionality such as power management and system clock adjustment, additional system cores and coprocessors, input/output (I/O) circuits, etc.

A malicious circuit may take many forms. Malicious circuit 22 is just one possible of type of malicious circuit that may be implemented on an IC without the knowledge of the manufacturer of the IC device 10. Malicious circuit 22 is an example of a malicious circuit that is designed to have a delayed activation. In malicious circuit 22, to ensure that activation of the malicious circuit 22 does not occur prematurely, or before or during production testing of IC device 10, counter 30 may be included and coupled to the logic, such as at the output of AND logic gate 24. Counter 30 will increment or decrement its value based on changes of the output of AND logic gate 24. Trigger circuit 32 will only trigger activation of malicious circuit 22 when a particular counter value is reached. In one embodiment, trigger circuit 32 is a "1-hot decoder". In another embodiment, the trigger may be based on analog values like aging, temperature, and/or digital values like register contents. Payload 34 performs a malicious behavior after being triggered, such as leaking secrets or blocking IC functionality. The secrets leaked may include, for example, encryption keys or passwords. Functional logic 14 may include synthesized logic that was first realized as a register-transfer level (RTL) design and implemented as registers and combinational logic on the integrated circuit device. Functional logic laid out on an IC may sometimes be referred to a "sea-of-gates". Malicious circuit 22 may be implemented in RTL along with the functional logic. As malicious circuit 22 is implemented with a delayed trigger, malicious circuit 22 will essentially be invisible, or nearly invisible, to a production type of test. A test circuit may be a self-testing circuit like LBIST or a test circuit external to the integrated circuit device using, for example, an automatic test pattern generator (ATPG). ATPG is software that creates test patterns. The test patterns are transferred to a test machine, or tool, that may be referred to as automatic test equipment (ATE).

LBIST block 12 is used to test the functionality of functional logic 14. Functional logic may be a very large part of the circuitry on IC 10. During testing, LBIST block 12 scans in a sequence of test patterns to test functional logic 14. For example, one test may be of a logic path including AND logic gate 24 and other logic 26. There may be many such paths on IC device 10. A resulting output of the scan test is provided to a scan chain (FIG. 2) and output from the scan chain via multiplexer 36 and flip-flop 38 as scan out (SO) in response to a scan enable signal SE. In addition to structural testing, LBIST block 12 may be used to trigger activation of payload 34, or to increment counter 30 that will eventually trigger payload 34, and then detect the presence of malicious circuit 22. Conventional production or lab validation testing may not trigger or detect malicious circuit 22 because of the activation delay provided by counter 30 and trigger circuit 32. A test pattern provided to, for example, an input of AND logic gate 24 by LBIST block 12 may not cause the output of AND logic gate 24 to activate trigger circuit 32. This is because prior to activation, the counter bits of counter 30 do not influence resulting scan vectors that are shifted out of a scan chain (see FIG. 2). The disclosed embodiment provides a method for triggering and detecting the existence of malicious circuits on an IC using LBIST block 12.

In general scan testing patterns include a relatively high percentage of "don't care" bits. That is, bits or flip-flop states that don't influence a resulting output scan vector that is shifted out of the scan chains. The "don't care" bits can be arbitrarily set to a "1" or a "0". For example, an ATPG tool may set the "don't care" bits to be all "0" or all "1" for a production test. In accordance with an embodiment, the "don't care" bits are pseudo-randomly changed for each scan test run as described below.

Figure 2:
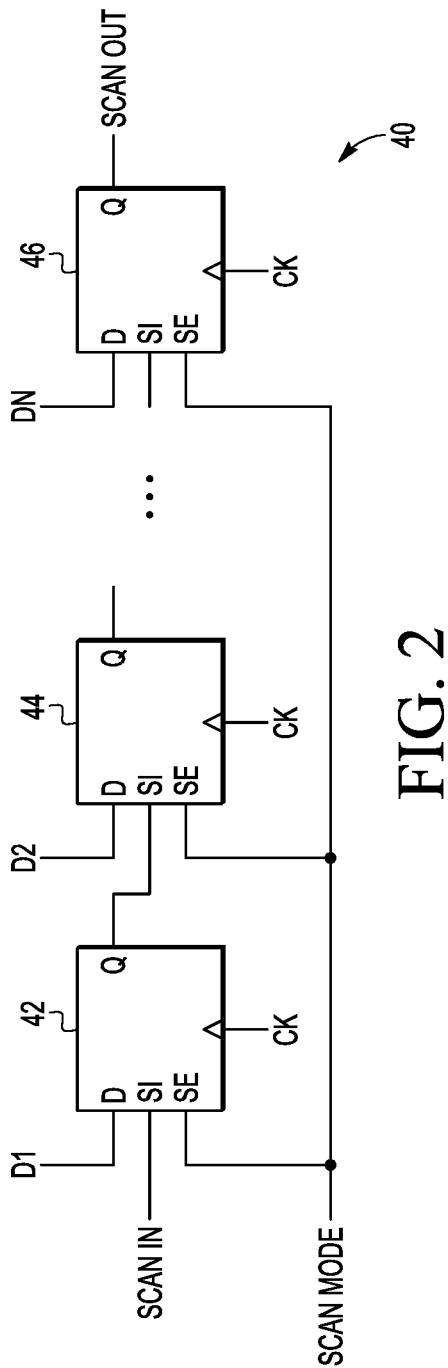
FIG. 2 illustrates a scan chain for use in the integrated circuit device of FIG. 1.

FIG. 2 illustrates scan chain 40 for use in IC device 10 of FIG. 1 in accordance with another embodiment. In FIG. 1, scan flop 28 includes a standard D-flop 38 and a multiplexer 36 with SE, D, and SE. In FIG. 2, the scan flop is illustrated as a stand-alone scan flop that already had SI, D, and SE inputs. Either embodiments can be used. Scan chain 40 includes a plurality of serially-connected flip-flops represented by flip-flops 42, 44, and 46. Each flip-flop has a scan-in input (SI), a data input (D) coupled to the combinational logic to be tested, a scan enable input (SE), a clock input (CK), and an output (Q). Each output Q of each flip-flop is coupled to the scan input SI of the preceding flip-flop. The last flip-flop in the chain provides a scan-out output signal (SCAN OUT). There may be a number of scan chains throughout functional logic 14.

Figure 3:
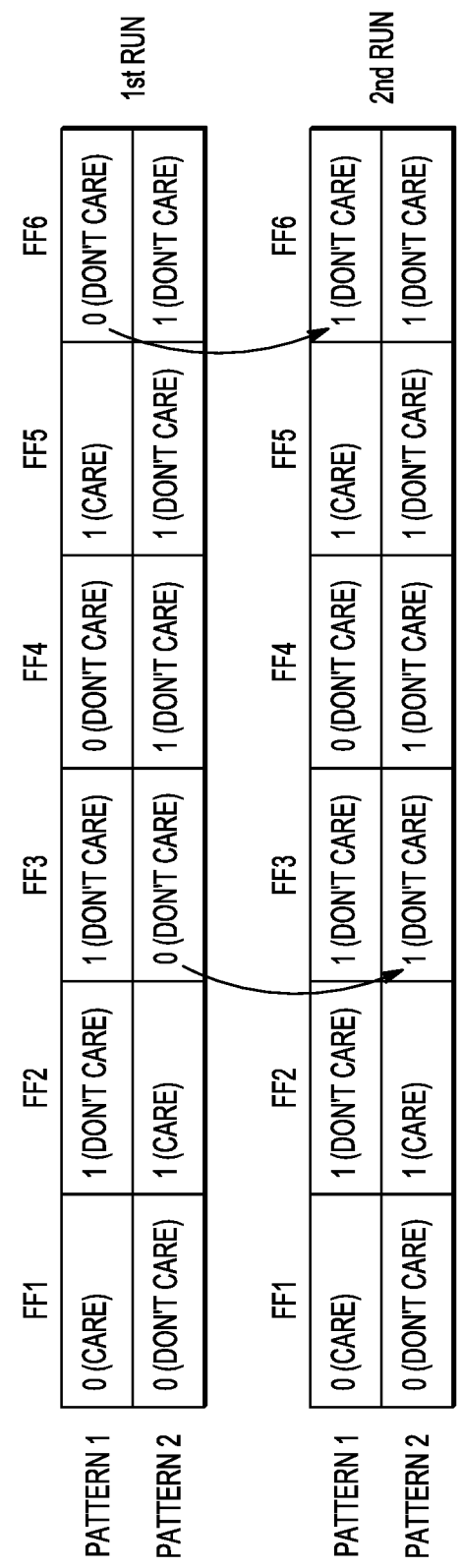
FIG. 3 illustrates test patterns for use in triggering and detecting a malicious circuit in the integrated circuit device of FIG. 1.

FIG. 3 illustrates example test patterns for use in triggering and detecting malicious circuit 22 in IC device 10 of FIG. 1. The test patterns are illustrated in form of scan cells. Each scan cell includes a flip-flop (FF). In the test patterns, the scan cells having "don't care" bits are set in a pseudo-random manner and varied from one test run to the next. Note that FIG. 3 limits the number of flip-flops in the scan chain to six for simplicity and clarity. In an actual IC, there can be any number of flip-flops. LBIST engine 16 in FIG. 1 calculates and provides a value (VALUE) for each scan cell (FF1-FF6) and a relevancy control signal (RELEVANT) that controls which input of multiplexer 20 is provided to test functional logic 14, for example, to test AND logic gate 24 in the illustrated example. The bit value of the control signal RELEVANT is determined by whether the scan cell VALUE is a "care" bit or a "don't care" bit. If the scan cell VALUE is a "don't care" bit, the bit VALUE is set by PRNG 18. The value of the "don't care" bits are calculated for each test run and hence the test runs usually differ from one scan run to the next. For example, two test runs are applied to AND logic gate 24 as illustrated in FIG. 3. A first test run (1$^{st}$ RUN) includes a first test pattern (PATTERN 1) and a second test pattern (PATTERN 2). A second test run (2$^{nd}$ RUN) also includes PATTERN 1 and PATTERN 2 test patterns. As illustrated, PATTERN 1 of the first test run has two "care" bits and four "don't care" bits, and PATTERN 2 has one "care" bit and five "don't care" bits. As can be seen in FIG. 3, the "care" bits of PATTERN 1 stay the same for the first and second scan test patterns of the first and second test runs. However, the "don't care" bits can change between the first and second test runs. For example, in FIG. 3, the output bit of FF3 in PATTERN 2 of the first test run changes from a "0" to a "1" in PATTERN 2 of the second test run, and the output bit of FF6 in PATTERN 1 of the first test run changes from a "0" to a "1" in PATTERN 1 of the second test run. The changing of the "don't care" bits from one scan test run to the next causes many different potential trigger conditions that would not be applied otherwise, for example, in a normal functional scan test. The output SO of the flip-flop 38 would be monitored during the scan test for unexpected responses that may indicate the presence of a malicious circuit such as malicious circuit 22.

The test patterns may be generated by a self-testing circuit on IC device 10, or by an external testing tool such as an ATPG tool. Because the type of malicious circuit would generally not be known, the method for triggering and detecting as described may be combined with other methods for testing for other types of malicious circuits. For example, a malicious circuit that is triggered by aging may be tested for by using a different method. Also, a scan test pattern directed to rarely occurring logic states may be created to detect other malicious circuits. In addition, an ATPG-based test point insertion to target functionally unused logic, or testing security-critical functions could be used and combined with the above described tests to trigger and detect various types of malicious circuits.

Figure 4:
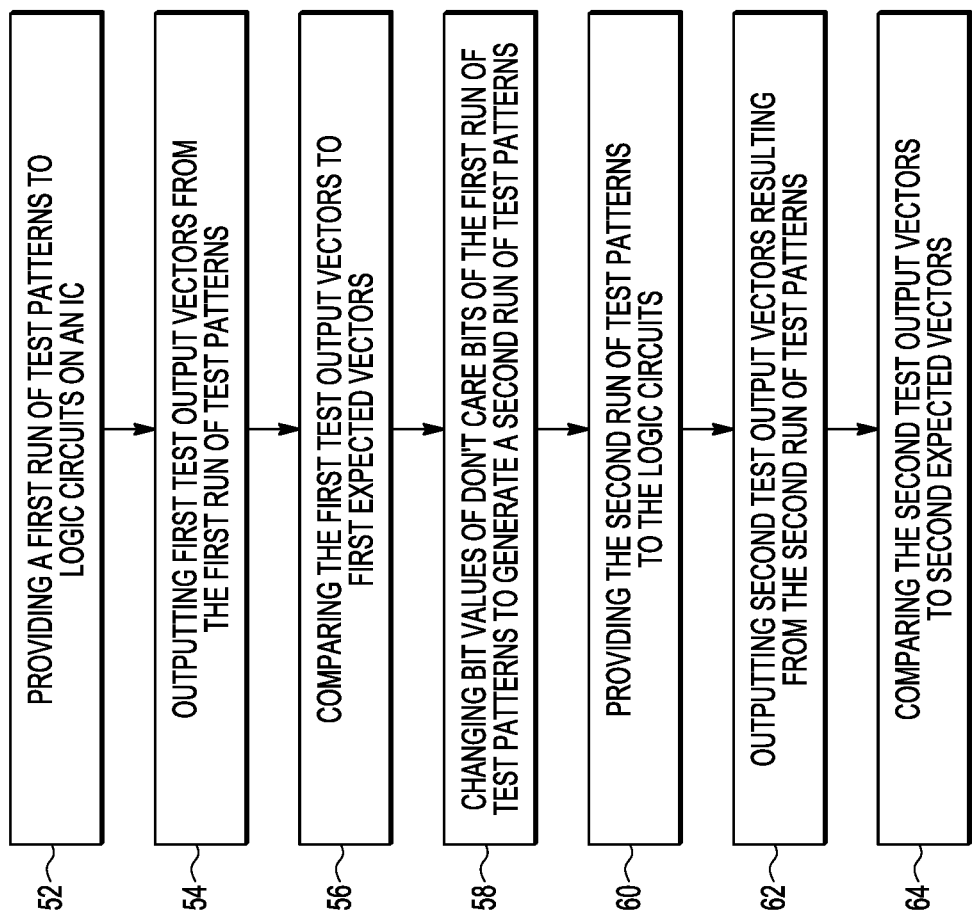
FIG. 4 illustrates a method for triggering and detecting a malicious circuit in the integrated circuit device of FIG. 1.

FIG. 4 illustrates method 50 for triggering and detecting a malicious circuit in IC device 10 of FIG. 1. Method 50 starts at step 52. At step 52, a first run of test patterns is provided to a logic circuit of IC device 10, e.g. AND logic gate 24. At step 54, first test output vectors are scanned from the first run of test patterns. At step 56, the first test output vectors are compared to first expected vectors. At step 58, the bit values of "don't care" bits of the first run of test patterns are changed to generate a second run of test patterns. At step 60, the second run of test patterns are provided to the circuit undergoing testing. In one embodiment, steps 58 and 60 are performed at the same time. For example, during creation of an LBIST scan vector, the "don't care" bits are filled with the pseudo-random vales. In other embodiments, the steps may be performed differently and at different times. At step 62, second test output vectors resulting from the second run are output. At step 64, the second test output vectors are compared to the second expected vectors. Results different than the expected results may indicate the presence of a malicious circuit in functional logic 14. Method 50 may be executed by self-testing circuits on IC device 10 or by an external testing tool.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for triggering and detecting a malicious circuit on an integrated circuit device, the method comprising:
   providing a first run of test patterns to logic circuits on the integrated circuit device, the first run of test patterns comprising a plurality of test patterns, each test pattern of the first run of test patterns comprising a plurality of bits, a first portion of the plurality of bits being bits that do not influence a value of a resulting first test output vector, and a second portion of the plurality of bits being bits that do influence the value of the first test output vector;
   outputting the first test output vector from the logic circuits in response to the first run of test patterns;
   comparing the value of the first test output vector to first expected values to produce first comparison results;
   changing bit values of the first portion of the plurality of bits for each test pattern of the first run of test patterns to generate a second run of test patterns while holding constant all of the bit values of the second portion of the plurality of bits;
   providing the second run of test patterns to the logic circuits on the integrated circuit device;
   outputting a second test output vector resulting from the second run of test patterns from the logic circuits;
   comparing a value of the second test output vector to second expected values to produce second comparison results; and
   monitoring the first and second comparison results for unexpected results that may indicate the presence of a malicious circuit on the integrated circuit device.

2. The method of claim 1, wherein the plurality of test patterns is generated by a self-testing circuit on the integrated circuit device.

3. The method of claim 2, wherein the self-testing circuit comprises a logic built-in self-test (LBIST) circuit.

4. The method of claim 1, wherein the first portion of the plurality of bits are characterized as being "don't care" bits, and the second portion of the plurality of bits are characterized as being "care" bits.

5. The method of claim 1, wherein changing bit values further comprises using a pseudo random number generator to change the bit values.

6. The method of claim 1, wherein the method further comprises triggering a malicious hardware circuit undetected by production testing.

7. The method of claim 1, wherein the first and second runs of test patterns are generated externally to the integrated circuit device using an automatic test pattern generator (ATPG).

8. The method of claim 1, wherein the logic circuits being tested are realized in a register-transfer level (RTL) design and implemented as registers and combinational logic on the integrated circuit device.

9. A method for triggering and detecting a malicious circuit on an integrated circuit device, the method comprising:
   scanning in a first run of test patterns to logic circuits on the integrated circuit device using logic built-in self-test (LBIST), the first run of test patterns comprising a plurality of test patterns, each test pattern of the first run of test patterns comprising a plurality of bits, a first portion of the plurality of bits being bits that do not influence a value of a resulting first test output vector, and a second portion of the plurality of bits being bits that do influence the value of the first test output vector;
   scanning out the first test output vectors from the first run of test patterns;
   comparing the value of the first test output vectors to first expected values to produce first comparison results;
   changing bit values of the first portion of the plurality of bits for each test pattern of the first run of test patterns to generate a second run of test patterns while holding constant all of the bit values of the second portion of the plurality of bits;
   scanning in the second run of test patterns to the logic circuits on the integrated circuit device;
   scanning out second test output vectors resulting from the second run of test patterns;
   comparing a value of the second test output vectors to second expected values to produce second comparison results; and
   monitoring the first and second comparison results for unexpected results that may indicate the presence of a malicious circuit on the integrated circuit device.

10. The method of claim 9, wherein the first portion of the plurality of bits are "don't care" bits, and the second portion of the plurality of bits are "care" bits.

11. The method of claim 9, wherein changing bit values further comprises using a pseudo random number generator to change the bit values.

12. The method of claim 9, wherein the method is for triggering a malicious hardware circuit undetected by production testing.

13. A computer program comprising executable instructions stored in a non-transitory computer-readable medium for implementing a method for triggering and detecting a malicious circuit on an integrated circuit device, the computer program comprising:
   instructions for scanning in a first run of test patterns to logic circuits on the integrated circuit device using logic built-in self-test (LBIST), the first run of test patterns comprising a plurality of test patterns, each test pattern of the first run of test patterns comprising a plurality of bits, a first portion of the plurality of bits being bits that do not influence a value of a resulting first test output vector, and a second portion of the plurality of bits being bits that do influence the value of the first test output vector;
   instructions for scanning out the first test output vectors from the first run of test patterns;
   instructions for comparing the value of the first test output vectors to first expected values to produce first comparison results;
   instructions for changing bit values of the first portion of the plurality of bits for each test pattern of the first run of test patterns to generate a second run of test patterns while holding constant all of the bit values of the second portion of the plurality of bits;

instructions for scanning in the second run of test patterns to the logic circuits on the integrated circuit device;

instructions for scanning out a second test output vectors resulting from the second run of test patterns;

instructions for comparing a value of the second test output vectors to second expected values to produce second comparison results; and instructions for monitoring the first and second comparison results for unexpected results that may indicate the presence of a malicious circuit on the integrated circuit device.

14. The computer program of claim 13, wherein the first portion of the plurality of bits are "don't care" bits, and the second portion of the plurality of bits are "care" bits.

15. The computer program of claim 13, wherein changing bit values further comprises using a pseudo random number generator to change the bit values.

16. The computer program of claim 13, wherein the logic circuits being tested are realized in a register-transfer level (RTL) design and implemented as registers and combinational logic on the integrated circuit device.

* * * * *